2,877,210

2,2'-METHYLENEBIS(5-ISOPROPYLPHENOL)

Ralph A. Bankert, Wilmington, Del., assignor to Hercules Powder Company, Wilmington, Del., a corporation of Delaware No Drawing. Application July 3, 1957
Serial No. 669,714

2 Claims. (Cl. 260—45.95)

This invention relates to a new chemical compound. More specifically, the invention pertains to the compound, 2,2'-methylenebis(5-isopropylphenol), which has exceptional utility as an antioxidant for rubber and other materials normally subject to deterioration by oxidation.

Throughout the prior art there are numerous references to phenolic compounds which are alleged to have antioxidant properties. For the most part, these phenolic compounds of the prior art are substituted in the ortho- and/or para-positions by a saturated hydrocarbon radical.

One phenolic compound of the above type which has been found especially useful as an antioxidant for rubber and which is considered by many persons skilled in the art to be the best nonstaining, relatively nondiscoloring antioxidant for protecting light-colored rubber vulcanizates is 2,2'-methylenebis(4-methyl-6-tert-butylphenol). While this compound is a highly effective antioxidant, it is well recognized as deficient in some applications because of an unpredictable tendency to impart color to aged and unaged rubber vulcanizates. There is thus a definite need for a compound which offers improved color stability over the aforesaid antioxidant without a sacrifice of antioxidant properties.

The present invention relates to 2,2'-methylenebis(5-isopropylphenol), a compound which has been found to possess excellent antioxidant properties and excellent color stability when employed as an antioxidant in rubber and which is easily prepared by the acid catalyzed reaction of m-isopropylphenol with formaldehyde. One of the distinguishing structural characteristics of the compound of the invention is the location of the isopropyl groups in positions meta to the phenolic hydroxyl groups, the significance of which is shown by the fact that the compound is considerably more effective as an antioxidant than its position isomers in which the isopropyl groups are in positions ortho and para, respectively, to the phenolic hydroxyl groups.

The invention is illustrated by the following examples, in which parts and percentages are by weight unless otherwise specified.

EXAMPLE 1

The preparation of the compound of the invention is illustrated in this example.

Into a reaction vessel was charged 192 parts of m-isopropylphenol, 40.6 parts of 36–38% aqueous formaldehyde solution and 1.2 parts of 2 N HCl solution. The reaction vessel was fitted with a reflux condenser, a stirrer and a thermometer. The stirred mixture was heated to reflux temperature (96–97° C.) and this temperature maintained for 2 hours. After cooling to room temperature, the mixture was diluted with 141 parts of ether and the aqueous layer drawn off. The ether layer was washed with three 100 part portions of water. After distilling the ether by heating to a pot temperature of 100° C./13 mm., the product was distilled. The portion of the distillate having a boiling point of 175–198° C./0.4–0.2 mm., was a soft, yellow resin having a molecular weight of 288, 294 (calculated 284). The distilled product amounted to 65.1 parts, representing a 45.8% conversion.

EXAMPLE 2

The effectiveness of the compound of the invention as an antioxidant in comparison with the para isomer of the compound and with the established antioxidant, 2,2'-methylenebis-(4-methyl-6-tert-butylphenol), is demonstrated in this example.

A master batch containing the following ingredients:

| | Parts by weight, grams |
|---|---|
| Pale crepe natural rubber | 100.0 |
| Zinc oxide | 5.0 |
| Altax | 1.5 |
| Stearic acid | 2.0 |
| Ultramarine blue | 0.2 |
| Titanium dioxide | 25.0 |
| Calcium carbonate | 80.0 |
| Sulfur | 2.15 | was prepared on a two-roll rubber mill at compounding temperatures ranging from 140–160° F. The master batch was then divided into aliquot portions and to each portion except a control portion there was added 1% of a chosen compound as an antioxidant. Intimate admixture of each compound was achieved on the mill by cross-cutting six times and then rolling six times. The compositions were then sheeted from the rolls and allowed to stand overnight. After standing 16 hours, each of the compositions was warmed ten minutes in an air oven at 212° F. preparatory to mill mixing to establish the mill direction and proper sheet thickness. After removing from the rolls, each composition was then allowed to stand for one hour at room temperature before curing. Two 6 x 6 x 0.075" sheets were cured from each composition at 274° F. for 15, 20 and 30 minutes. The curing operation was conducted in a preheated, four-cavity 6 x 6 x 0.075" compression type mold.

After removing the sheets from the mold, the vulcanizates were allowed to reach equilibrium at room temperature before cutting specimens for testing. A total of three type C dumbbell specimens were then cut at each cure time for determining unaged tensile properties (ASTM D412–497). Four type C dumbbell specimens were cut for outdoor aging (exposure to atmospheric oxidation facing 45° south) and three type C specimens were cut from each sheet for test tube aging. In the latter aging test, the samples were aged in an apparatus by a modification of ASTM D865–52T. In this test air at room temperature was passed through the glass tube extending to the bottom of the test tube, and exhausted through a short length of tubing in the stopper of the test tube. The tubes were maintained at a constant temperature of 80° C. by means of a circulating oil bath. This modification provides a gentle but continuous flow of metered air through each test tube that is measured and controlled by individual flow meters. The test specimens were aged by this method for two weeks.

In the aging tests the vulcanizate containing 2,2'-methylenebis(4-methyl-6-tert-butylphenol) was taken as the standard and the results on the other vulcanizates are reported in terms of percent tensile strength retention at optimum cure in comparison with this standard. Also noted in the table of results that follows are the color properties of the various vulcanizates before and after aging.

Table

| Antioxidant | Percent Retention of Tensile Strength | | Color | |
|---|---|---|---|---|
| | Test Tube Aged | Outdoor Aged | Test Tube Aged | Outdoor Aged |
| 2,2'-Methylenebis(4-methyl-6-tert-butylphenol) | Standard | Standard | Very Slight Discoloration. | Light Green Color. |
| 2,2'-Methylenebis(5-isopropylphenol) | 94 | 109 | do | No Discoloration. |
| 2,2'-Methylenebis(4-isopropylphenol) | 86 | 75 | do | Do. |
| None | 60 | 41 | do | Do. |

From the results it is apparent that the compound of the invention is an extremely effective rubber antioxidant and is at least equivalent in antioxidant properties to the prior art compound [2,2'-methylenebis(4-methyl-6-tert-butylphenol)] considered by many as the best nonstaining rubber antioxidant. Notably also, the compound of the invention produces significantly less discoloration on outdoor aging than the prior art antioxidant and from this standpoint can be considered superior. Additionally, the results show that the para-substituted isomer of the compound of the invention is significantly less effective as an antioxidant.

As has been illustrated in Example 1, the compound of the invention can be conveniently prepared by reacting m-isopropylphenol with formaldehyde in combining molar proportion of 2:1. In this reaction an excess of m-isopropylphenol is desirably employed with the excess m-isopropylphenol being removed at the completion of the reaction. As catalysts for the reaction, any of the acids known to be suitable for promoting the condensation of phenols with formaldehyde can be employed. Mineral acids such as HCl are convenient catalysts.

In addition to being an excellent antioxidant for natural rubber as has been illustrated in the examples, the compound of the invention is also useful as an antioxidant in synthetic rubbers which are broadly definable as synthetic, rubbery polymers of a conjugated diolefin or chloroprene. Such polymers include, for instance, polymerization products of butadiene and its derivatives and homologs, e. g., methylbutadiene, dimethylbutadiene, isoprene, pentadiene and, of course, chloroprene, and synthetic, rubbery copolymers of the conjugated diolefins with other unsaturated organic compounds such as styrene, acrylonitrile, isobutylene, etc.

In addition to the use of the compound in rubber, it is also useful for stabilizing other materials such as animal and vegetable oils, petroleum oils, waxes, soaps, etc., against deterioration by oxidation.

For purposes of retarding the deterioration of any of the aforesaid organic materials, the amount of the compound can be varied considerably according to the type and nature of the material to be treated. Usually, however, the compound is effective in small amounts ranging from about 0.1 to 5% by weight of the material in which it is used.

What I claim and desire to protect by Letters Patent is:

1. A composition of matter prepared by reacting m-isopropylphenol with formaldehyde in molar proportion of 2:1 in the presence of an acid catalyst and comprising a compound having the probable formula:

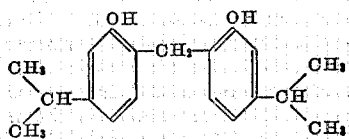

2. Rubber stabilized against oxidative deterioration by the presence of a minor amount of a composition prepared by reacting m-isopropylphenol with formaldehyde in molar proportion of 2:1 in the presence of an acid catalyst and comprising a compound having the probable structure:

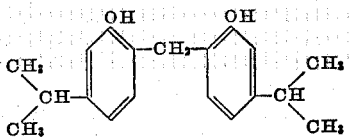

References Cited in the file of this patent
UNITED STATES PATENTS

| | | |
|---|---|---|
| 1,214,414 | Berend | Jan. 30, 1917 |
| 2,542,688 | Johnson et al. | Feb. 20, 1951 |
| 2,603,662 | Stevens | July 15, 1952 |
| 2,628,212 | Young | Feb. 10, 1953 |
| 2,752,398 | Riley | June 26, 1956 |